Patented Sept. 4, 1951

2,566,862

UNITED STATES PATENT OFFICE 2,566,862

STARCH COMPOSITION

John Studeny, Stamford, Conn., assignor to American Cyanamid Company, New York, N. Y., a corporation of Maine No Drawing. Application May 5, 1948, Serial No. 25,303

2 Claims. (Cl. 106—213)

This invention relates to converted starch adhesives and relates more particularly to converted starch adhesive and sizing compositions containing an agent serving to impart thereto greatly improved fluidity, stability, and adhesive characteristics.

The starch adhesive and sizing compositions embraced by the present invention include those which are of the directly-used type and also those of the remoistening variety. The starch adhesive compositions are those which are applied and which serve at once as adhesives between sheets of paper, wood plies, textile sheets, etc., as well as those which are applied to the surfaces of sheets of paper, textiles, and the like in film form and are then reactivated by a moistening treatment for bonding or union thereof with another material or surface. The sizing compositions are those which are suitable for textile sizing or the like applications, and those starches which are suitable for application to the beater, stock chest, head box, tub press calender, etc. in paper manufacture. Likewise, the starch compositions may be employed as binding adhesives in pigment coatings, printing pastes, and the like materials, for paper, textile, leather and other surfaces.

Ordinarily, the employment of aqueous dispersions of converted starch as adhesives or as sizing materials is attended by a twofold disadvantage. First, the initial viscosity of the aqueous starch dispersion increases rapidly as the amount of converted starch therein is increased. For this reason, it is often impracticable to employ dispersions containing more than about 10-20% of converted starch by means of tub sizing, roll, and other commonly employed application treatments. Second, aqueous dispersions of converted starch are ordinarily quite fluid-unstable in that the materials increase in viscosity upon aging and after the lapse of a relatively short period of time become thick, unpourable hydrogels. For these reasons, it has been the ordinary practice to prepare converted starch adhesive and sizing compositions containing relatively small amounts of starch and to use these compositions as quickly as possible in order to prevent excessive waste of the materials through gelling thereof.

I have found that the addition to converted starch adhesive and sizing compositions of a small amount of a compound of the class consisting of water-soluble salts of dicyanoguanidine imparts greatly improved initial fluidity, fluid stability during storage and adhesive characteristics to the treated compositions. My novel addition agents may be satisfactorily employed to reduce the initial viscosity and improve the fluid stability of the ordinary converted starch adhesives and sizes which are obtained by chlorination, oxidation, enzyme action, and the like treatment of corn, potato, cassava, wheat, and the like starch-containing materials.

Included among the water-soluble dicyanoguanidine salts which are the fluid-stabilizing agents in the present invention are such compounds as the ammonium and alkali metal salts of dicyanoguanidine. The preparation of these salts is described in U. S. Patent No. 2,371,100 to Kaiser and Thurson. Briefly, ammonium and alkali metal dicyandiamide are reacted with cyanogen chloride in accordance with the following equations to yield the corresponding salts of 1,3-dicyanoguanidine:

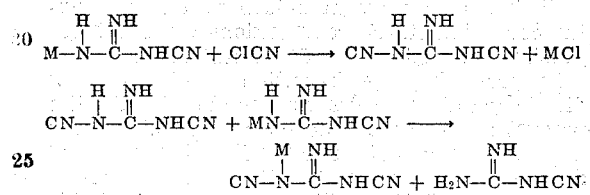

These salts form nearly neutral aqueous solutions and have decomposition temperatures ranging from about 210°–310° C.

Also included among my preferred fluid-stabilizing agents are the ammonium and alkali metal salts of lower alkyl-substituted dicyanoguanidines such as, for example, the potassium, sodium, and ammonium salts of methyl, ethyl, and butyl dicyanoguanidine. These compounds are prepared in a manner similar to that set forth in the above equations by reacting cyanogen chloride with the ammonium and alkali metal salts of lower alkyl-substituted dicyandiamides. I have found, however, that where the alkyl substituent contains more than about 8 carbon atoms, the substituted dicyanoguanidine salt is not sufficiently active to be satisfactorily employed as a fluidifying agent for converted starch compositions. Therefore, in the present specification the term "lower alkyl-" will be understood to mean only those alkyl substituents containing less than about 8 carbon atoms.

These water-soluble salts of alkyl-substituted dicyanoguanidine are relatively heat stable and, similarly to the above described ammonium and alkali metal salts of dicyanoguanidine, form nearly neutral aqueous solutions. All of my preferred fluidifying agents, being salts of strong monobasic acids with strong bases, are relatively stable over the pH range encountered in starch adhesives and sizes.

One of the advantages to be derived from the present invention resides in the heat stability of my preferred water-soluble dicyanoguanidine salts. Because of this heat stability, I am enabled to add the fluidifying agent to the converted starch dispersions prior to the heat treatment which is ordinarily resorted to in order to develop the adhesive properties of the starch.

The dicyanoguanidine salts undergo little or no decomposition during this heat treatment and very satisfactorily reduce the initial viscosity of the starch compositions and also render them fluid-stable for relatively long periods of time.

Another outstanding feature of my invention resides in the fact that my nearly neutral water-soluble dicyanoguanidine salts do not appreciably alter the pH values of the converted starch dispersions to which they are added. Thus, for example, in employing highly dextrinized starches which are ordinarily used as remoistening adhesives for paper envelopes, gummed tapes, and the like, the initial acidity of the starch compositions is maintained substantially unaltered throughout the use thereof. Such highly dextrinized starches may have initial pH values of from about 2 to about 5 and this acidity must often be maintained in order to prevent deterioration of their adhesive properties.

On the other hand, in certain other types of converted starch adhesive applications, near-neutrality or even moderate alkalinity is required. It is of equal importance that this near-neutrality or alkalinity be maintained throughout the use of these particular starch compositions. It will be seen, therefore, that my novel converted starch fluid-stabilizing agents provide a distinct advantage in fluidifying and stabilizing converted starch compositions while not appreciably changing the pH values thereof.

In practicing the invention, fluid-stabilizing dicyanoguanidine salts are employed. In the present specification, the term "fluid-stabilizing amounts" may best be defined as the range of amounts of my novel fluidifying agents which will impart fluid-stability to converted starch dispersions while substantially maintaining the initial pH values of the dispersions. I have found that in some instances as little as 0.5% of these addition agents, based on the dry weight of starch present, will satisfactorily fluidify and stabilize converted starch compositions. Normally, however, the most satisfactory initial fluidity of the compositions will be obtained when from about 1% to about 5% of the addition agents are employed. On the other hand, because of their excellent water solubility it is possible when desired to employ amounts of my addition agents up to 20-30% of the dry weight of the starch in the dispersions, and the use of even these large amounts does not materially change the pH thereof. It will thus be seen that quantities as small as 0.5% and as large as 20-30%, based on the dry weight of the converted starch, are indicated by the term "fluid-stabilizing amount" as used in the present specification and claims.

Inasmuch as my novel fluid-stabilized converted starch compositions are initially much less viscous than those which have heretofore been employed in the art, it will be seen that the quantities of starch which it is possible to incorporate in paper, leather, textiles, etc. may be increased without seriously interfering with the commonly employed methods of applying such adhesive and sizing compositions thereto. This is of particular importance where the converted starch compositions are to be used in conjunction with the addition of various pigments and other fillers to paper, etc. In such uses, it will be readily understood that because of the fluidifying action of the addition agents of the invention, the total solids content of the coating compositions may be increased while maintaining the desirable viscosity and flow characteristics thereof. I am thus enabled to obtain substantial economies in drying the coated paper, while at the same time reducing undesirable penetration of the coating material into the paper sheet.

The invention will be more thoroughly explained by the following illustrative examples.

*Example 1*

60 grams of a commercial oxidized corn starch were added to 240 grams of demineralized water. 3 grams of potassium dicyanoguanidine were added to the dispersion, after which it was heated to 190° F. on a water bath and maintained at this temperature for about 15 minutes. The composition was thereafter cooled and set aside for periodic viscosity and pH tests, the viscosity determinations being made with a Brookfield Viscosimeter at 60 R. P. M. A control sample was also prepared according to the above described procedure, but without the addition thereto of a fluidifying agent. The test results are tabulated below.

| Sample | Brookfield Viscosity in Cp. Aging Time in Hours | | | | | pH Range |
|---|---|---|---|---|---|---|
| | 3 | 25 | 51 | 76 | 143 | |
| Control | 1,000 | 1,500 | 1,800 | 2,040 | 2,700 | 6.77-6.95 |
| 5% Potassium dicyanoguanidine | 564 | 736 | 836 | 852 | 904 | 7.00-7.09 |

*Example 2*

6 starch dispersions were prepared by mixing, in each instance, 60 grams of a commercial oxidized corn starch with 240 grams of demineralized water. One sample remained untreated, while to the five remaining dispersions were added 5% respectively, based on the weight of the starch, of ammonium, sodium, potassium, and guanidine dicyanoguanidine, and the potassium salt of butyl dicyanoguanidine. All of the samples were then heated on a water bath to 174° F., maintained at this temperature for 15 minutes, and then allowed to cool. The samples were then set aside for periodic viscosity and pH tests as in Example 1. Test results are as follows.

| Sample | Brookfield Viscosity in cp., Aging Time in Hours | | | | pH Range |
|---|---|---|---|---|---|
| | 3 | 28 | 51 | 118 | |
| Control | 1,820 | 2,400 | 2,760 | 3,120 | 6.95-7.06 |
| Ammonium dicyanoguanidine | 1,720 | 2,220 | 2,260 | 2,300 | 6.35-6.85 |
| Sodium dicyanoguanidine | 1,600 | 2,000 | 2,060 | 2,160 | 6.75-7.04 |
| Potassium dicyanoguanidine | 1,760 | 2,000 | 2,100 | 2,380 | 6.46-6.97 |
| Guanidine dicyanoguanidine | 1,900 | 2,240 | 2,260 | 2,580 | 6.85-6.97 |
| Potassium salt of butyl dicyanoguanidine | 1,720 | 2,100 | 2,020 | 2,300 | 6.96-7.15 |

*Example 3*

The procedure of Example 2 was repeated except that four dispersions were prepared containing respectively 0%, 0.1%, 0.5%, and 1.0% of sodium dicyanoguanidine as the fluidifying agent. The following test results were obtained.

| Sample | Brookfield Viscosity in cp. at— | | | | | | pH Range |
|---|---|---|---|---|---|---|---|
| | 3 hrs., 79° F. | 22 hrs., 73.5° F. | 45.5 hrs., 74° F. | 70 hrs., 70° F. | 94 hrs., 71° F. | 190 hrs., 72° F. | |
| Control | 612 | 1,264 | 1,472 | 2,480 | 2,980 | gelled | 7.0–7.1 |
| 0.1% Sodium dicyanoguanidine | 688 | 1,440 | 1,652 | 2,560 | 3,360 | do | 6.9–7.2 |
| 0.5% Sodium dicyanoguanidine | 708 | 1,236 | 1,472 | 2,260 | 2,760 | thick fluid | 6.4–7.3 |
| 1.0% Sodium dicyanoguanidine | 580 | 976 | 1,104 | 1,588 | 2,200 | do | 6.3–7.2 |

It will be seen from the above illustrative example that the present invention provides converted starch compositions having initial viscosities which are lower than those which have heretofore been obtained by the art and which, in addition, maintain fluid stability throughout a relatively long storage period. The present invention also permits the use of increased solids contents in adhesive and sizing compositions.

In some instances, it may be advantageous to compound our fluid-stabilizing converted starch compositions with other fluidifying agents and with various plasticizing agents. In this respect urea and the like fluidifying agents, and such plasticizers as glycerol, ethylene glycol and other polyhydric alcohols or their equivalents may be compounded with my novel converted starch compositions to obtain dried sizing films which are characterized by their improved pliability. Likewise, my novel fluid-stabilizing starch compositions may be blended in all proportions with other commonly employed sizing materials such as wax sizes, glue, casein, water-soluble resins and cellulose derivatives and various emulsions, as well as with fire proofing, mildew proofing and the like agents.

What I claim is:

1. A fluid-stable converted starch normally tending to gel when prepared with plain water and allowed to stand but transformed under similar conditions to substantial fluid-stability by the presence therein of a fluid-stabilizing amount of a water-soluble salt of dicyanoguanidine with an inorganic base selected from the group consisting of alkali metal and ammonium.

2. A fluid-stable converted starch consisting essentially of converted starch together with from 0.5% to 25% of its weight of a fluid stabilizing agent selected from the group consisting of alkali metal and ammonium salts of dicyanoguanidine.

JOHN STUDENY.

REFERENCES CITED

The following references are of record in the file of this patent:

UNITED STATES PATENTS

| Number | Name | Date |
|---|---|---|
| 2,282,364 | Kunze et al. | May 12, 1942 |
| 2,371,100 | Kaiser et al. | Mar. 6, 1945 |